US006836887B1

(12) United States Patent
Such

(10) Patent No.: US 6,836,887 B1
(45) Date of Patent: Dec. 28, 2004

(54) RECYCLABLE LOCKING FOR MULTI-THREADED COMPUTING ENVIRONMENTS

(75) Inventor: Ondrej Such, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/217,389

(22) Filed: Dec. 21, 1998

(51) Int. Cl.[7] ................................. G06F 9/00
(52) U.S. Cl. ............................. 718/104; 707/8
(58) Field of Search .................. 718/104, 106; 707/8; 709/316, 104; 719/316

(56) References Cited

U.S. PATENT DOCUMENTS 5,687,073 A * 11/1997 Kishimoto ................. 713/2
5,797,004 A * 8/1998 Lindholm et al. ......... 709/104
6,098,089 A * 8/2000 O'Connor ................. 709/104
6,237,043 B1 * 5/2001 Brown et al. ............. 709/316
6,374,286 B1 * 4/2002 Gee et al. ................. 709/108
6,411,983 B1 * 6/2002 Gallop ...................... 709/104
6,430,638 B1 * 8/2002 Kessler et al. ............ 710/200

OTHER PUBLICATIONS

Appel, A.W., "Testing Class Membership", In: *Modern Compiler Implementation in ML*, Cambridge University Press, 300–304, (1998).

* cited by examiner

*Primary Examiner*—Meng-Al T. An
*Assistant Examiner*—Li Zhen
(74) *Attorney, Agent, or Firm*—Christensen O'Connor Johnson Kindness PLLC

(57) ABSTRACT

Recyclable locking for multi-threaded computing environments is disclosed. In one embodiment, a system includes at least one thread, a pool of locks, at least one object, and a recyclable locking mechanism. Each object has an associated variable. The mechanism associates a lock with an object using the associated variable of the object as a pointer, upon a first request by a thread.

15 Claims, 4 Drawing Sheets

RECYCLABLE LOCKING FOR MULTI-THREADED COMPUTING ENVIRONMENTS

FIELD

This invention relates generally to multi-threaded computing environments, and more particularly to optimistic recyclable locking using complex locks for such environments.

BACKGROUND

Traditionally, computing environments in which computer programs are run have been single threaded. This means that only one task can be run within the computing environment at a time. This places constraints on both users and programs. A user for im example, is thus able to only run one program at a time. Similarly, a program is only able to run a single task, or thread, at a time.

Therefore, computing environments have been created that are multi-threaded. A user, is thus typically able to run more than one computer program in such environments at a single time, for example, both a word processing program and a spreadsheet program. Similarly, a program is in such environments usually able to run multiple threads or tasks concurrently, for example, a spreadsheet program can calculate a complex formula that may take minutes to complete while concurrently permitting the user to still continue editing a spreadsheet.

A problem arises, however, when two threads, either of the same or different programs, attempt to access the same data object (which may in a non-limiting and nonexclusive sense be defined as a software component) at the same time, where exclusive access to the object is required by one or both of these threads. Such concurrent access of the same object may result in corruption of programs' data structures, ultimately causing the computer to crash. Therefore, when a given thread accesses an object, generally it is provided a lock on that object, for example, utilizing a lock object so that other threads can only acquire limited rights to the object until the given thread is finished with using the object. For instance, to improve thread throughput, it may be desirable to implement Read-Write locks, allowing for multiple threads to read the data structure, but only one thread modifying it. Another example may be a SQL database, in which appending is a very common situation, and thus it is desirable to make it a non-blocking procedure, which is often done by implementing a complex lock structure.

Locking mechanisms may be inefficient, however. If a lock object exists for every object within a given computing environment, or system, the result is a doubling of the number of objects within the system just to enable objects to be locked. Such an approach is thus an inefficient use of resources, both in terms of memory to store the lock objects, as well as the overhead to maintain these objects. For these and other reasons, there is a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a system includes at least one thread, a pool of locks, at least one object, and a recyclable locking mechanism. Each object has an associated variable. The mechanism associates a complex lock with an object using the associated variable of the object as a pointer, upon a first request by a thread. All operations can be expressed using Win32 API's thus providing for portable implementation on the prevalent software operating systems.

Thus, embodiments of the invention provide for advantages not found in the prior art. The number of complex locks can be much less than the number of objects in the system. When a thread desires to use an object, in one embodiment it sends a request to the recyclable locking mechanism, which then associates a lock from the pool of locks to the desired object. When the thread is finished with the object, and no other threads require use of the object, the associated lock is recycled for reuse.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section; the hardware and the operating environment in conjunction with which embodiments of the invention may be practiced are described. In the second section, a system of one embodiment of the invention is presented. In the third section, a method, in accordance with an embodiment of the invention, is provided. In the fourth section, data structures, in accordance with an embodiment of the invention, are given. Finally, in the fifth section, a conclusion of the detailed description is provided.

Hardware and Operating Environment

Figure 1:
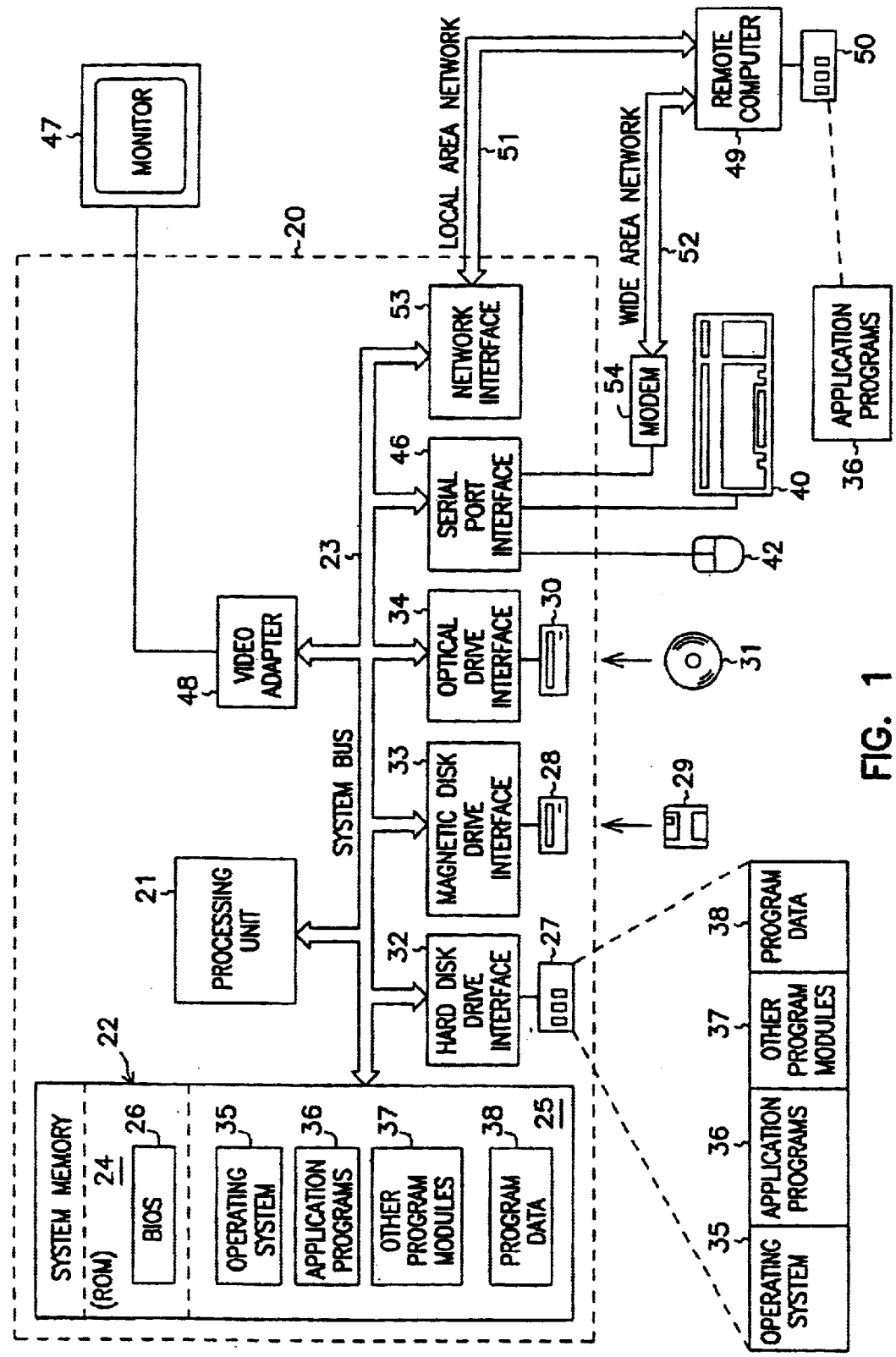
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. Underlying CPU has to implement means of atomic operations, be it interlocked operations found on Intel x86 architecture, or lock/store conditional found on Alpha and PowerPC architectures, or some other atomic operation. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
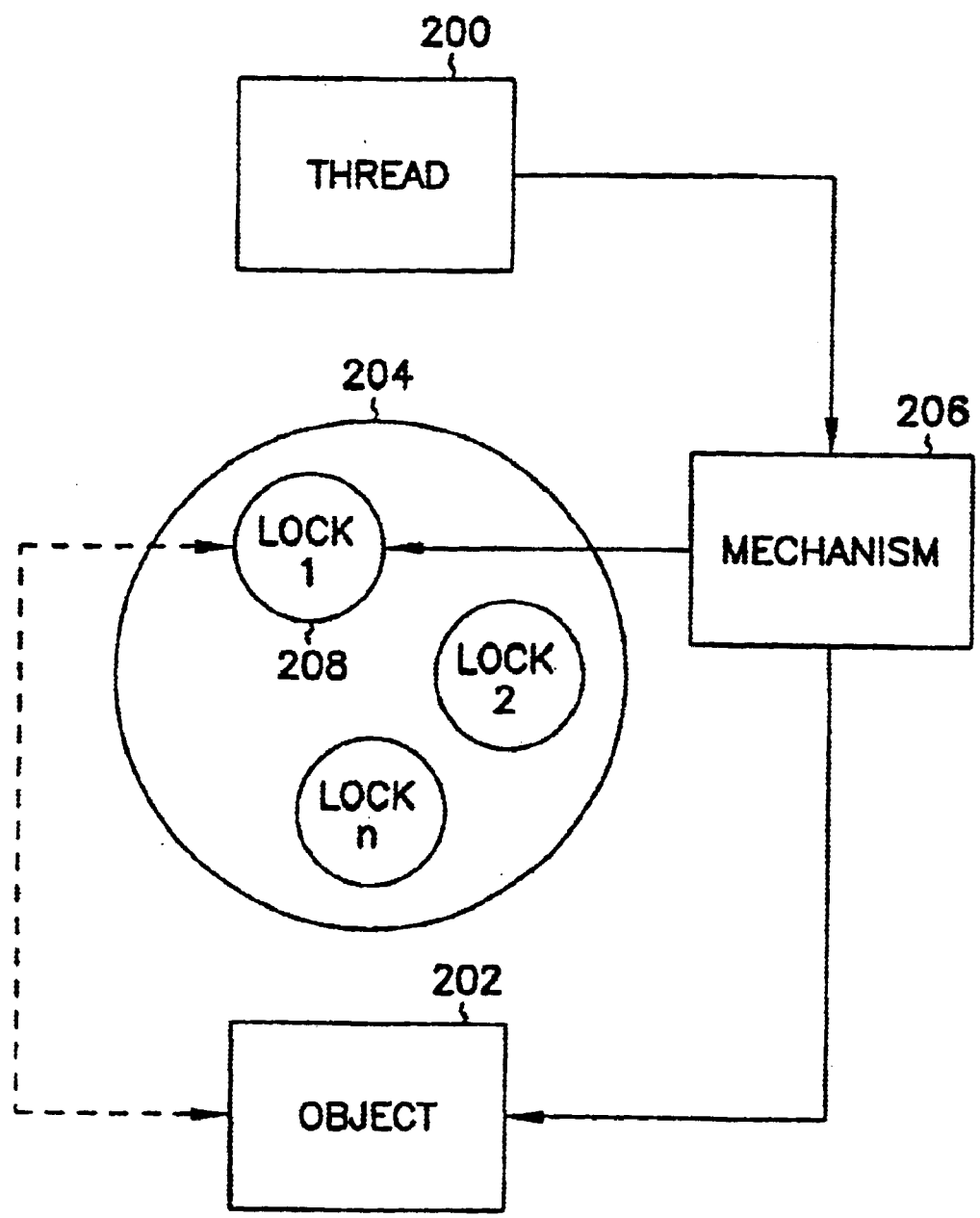
FIG. 2 shows a block diagram of a system according to one embodiment of the invention.

In this section of the detailed description, a description of a computerized system according to an embodiment of the invention is provided. The description is provided by reference to FIG. 2. Referring now to FIG. 2, a system according to an embodiment of the invention is shown. The system includes a thread 200, an object 202, a pool of locks 204, and a recyclable locking mechanism 206. Only one thread 200 and one object 202 are shown for purposes of descriptive clarity. Those of ordinary skill within the art can appreciate, however, that the invention is not so numerically limited.

The thread 200 is an executable task within the system of FIG. 2. The task may be a computer program in and of itself, or may be one of a plurality of tasks of a single computer program. Where there are or can be more than one thread, such as the thread 200, the system of FIG. 2 is said to be a multi-threaded computing environment, as those of ordinary skill within the art can appreciate.

The object 202 is a software object, as has been previously described in the background section. The invention is not particularly limited to a given type of the object 202. Such object types include a Java object, a Component Object Model (COM) object, a C++ object, etc. The object 202 has an associated variable, which in one embodiment can be an integer, as that construct is used within computer languages such as C and C++. For the object 202 to be locked to the thread 200, it has the associated variable act as a pointer to one of the locks within the pool of locks 204.

The pool of locks 204 includes a plurality of complex lock objects, such as the lock object 208. Each lock object, such as the lock object 208, is a specific type of software object that is specifically utilized to lock an object, such as the object 202, to a thread, such as the thread 200, when a pointer of the object points to the lock object. In one embodiment, there are significantly less lock objects within the pool 204 than there are total software objects, such as the object 202.

The recyclable locking mechanism 206 associates a lock within the pool 204, such as the lock object 208, with an object, such as the object 202, using the associated variable of the object as a pointer to the lock, upon a first request by a thread, such as the thread 200, in one embodiment where the object 202 has not been previously locked by another thread. Pursuant to a second request by the thread, the mechanism 206 further deassociates the lock from the object, such that the lock is recycled, that is, can be reused.

Thus, the lock objects within the pool 204 are not permanently assigned to any one object; rather, they are temporarily assigned to objects as needed. When no thread is using a given object having an associated variable pointing to a given lock object, the pointer is reset, and the lock object is available for use as to another object. In this manner, fewer lock objects than objects are necessary. In general, only a number of locks is needed as to the maximum number of objects that need to be locked at any given time.

The system of FIG. 2 may operate in accordance with one embodiment of the invention as follows. The thread 200 desires to use the object 202. To ensure that it will have exclusive access to the object 202, it sends a first request to the mechanism 206. Assuming that the object 202 is not being used by another thread, the mechanism 206 uses the associated variable of the object 202 as a pointer to an available lock object of the pool 204, such as the lock object 208. In the case where another thread is currently using the object 208 exclusively, the object 208 has an in-use status such that the thread 200 cannot use it until the other thread is finished (in another embodiment, non-exclusive access to the object is permitted, such that both threads are able to use the object). Furthermore, in the case where the thread 200 sends a first request to the mechanism 206 while the mechanism 206 is in the midst of assigning the associated variable of object 202 to a lock object, the object 202 has a spin status such that the thread 200 understands that it must try to obtain access to the object 202 at a later time.

However, in the case where the thread 200 does in fact obtain access to the object 202, when it is finished using the object 202, it sends a second request to the mechanism 206. This time, the mechanism 206 deassociates the associated variable of the object 202 so that it no longer points to the lock object 208, assuming that no other threads are seeking to use the object 202, such that the lock object 208 is again available for use in conjunction with the same object or another object. In the case where another thread had wanted to use the object 202 and the thread 200 had exclusive access to the object 202, however, the lock object 208 remains associated with the object 202 via the associated variable of the object 202, so that this other thread can then have exclusive access to the object 202.

Method

In this section of the detailed description, a method according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a recyclable locking mechanism program is executed by the processor from the medium to associate a lock with an object using an associated variable of the object as a pointer. The method of FIG. 3 can further be used in conjunction with the system of FIG. 2, as will be apparent to those of ordinary skill within the art.

Figure 3:
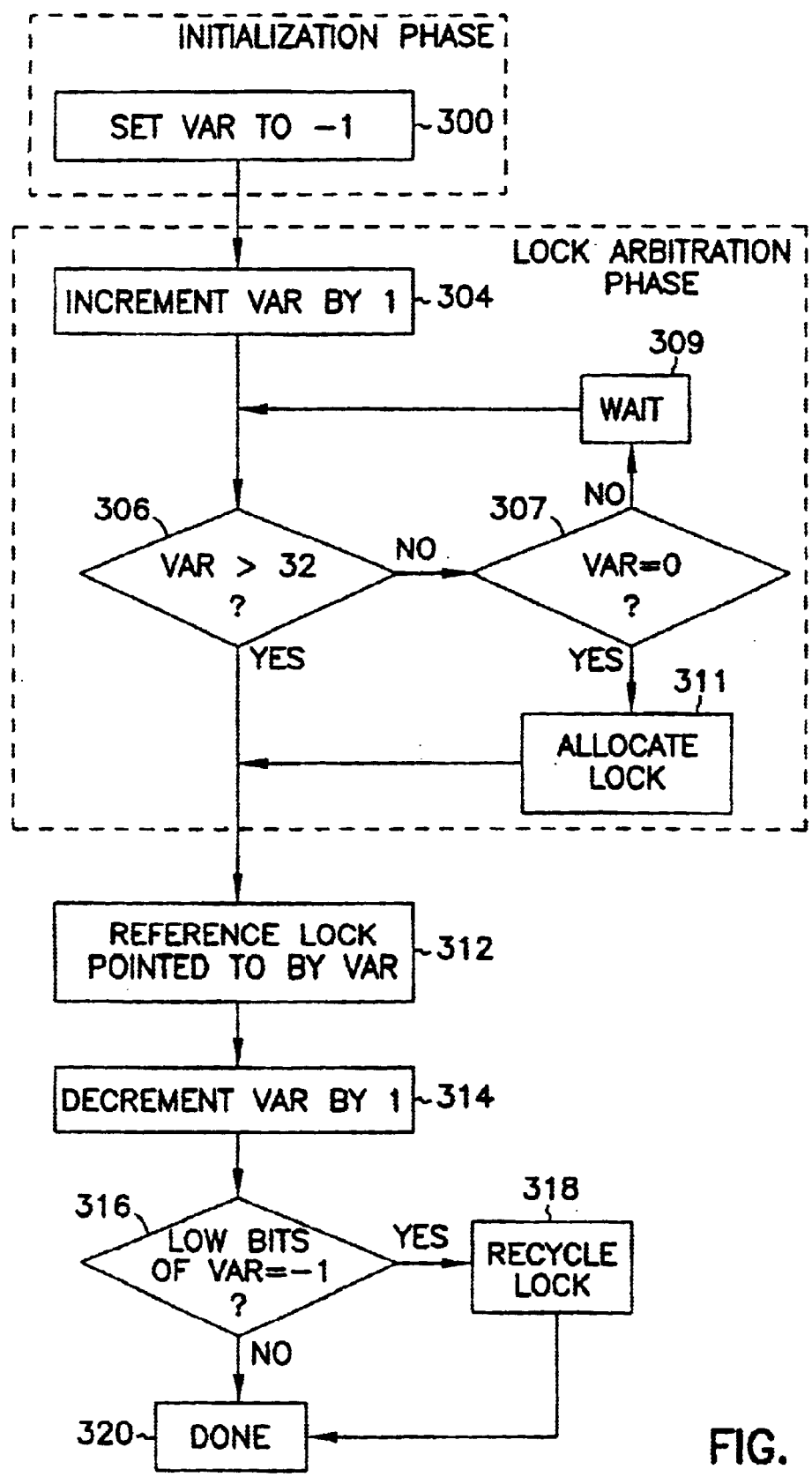
FIG. 3 shows a flowchart illustrating a method according to one embodiment of the invention.

Referring now to FIG. 3, a flowchart of a method according to one embodiment of the invention is shown. In 300, which is an initialization phase, an associated variable of an object, such as the object 202 of FIG. 2, is reset by in one embodiment by being set to −1. The associated variable includes a set of high bits and a set of low bits, where the set of high bits followed by a zeroed set of low bits acts as a lock pointer, and the set of low bits acts as a status variable regarding whether the object is currently being used. The number of low bits that corresponds has to be greater or equal to the logarithm with base 2 of the maximum number of threads they may attempt to associate a lock with an object at the same time. Moreover, it is assumed that all locks are aligned at addresses of which all low bits are zero.

In one embodiment, the set of high bits and the set of low bits are ordered within the variable in the format hhhhhhhhhhhhhhhhhhhhhhhhhhhhhhllllll, where each h represents a high bit and each l represents a low bit. 304, 306, 307, 309 and 311 make up a lock arbitration phase, in which a first lock instruction has already been asserted by a thread. In 304, the associated variable of the object is incremented, in one embodiment by 1 by the thread itself, in another embodiment, a recyclable locking mechanism, such as the mechanism 206 of FIG. 2, performs the incrementation, for instance by calling Win32 API InterlockedIncrement( ).

In 306, it is determined whether the associated variable is greater than a predetermined boundary value, in one embodiment by the recyclable locking mechanism such as the mechanism 206 of FIG. 2. In one embodiment, the boundary value is equal to 32. In such an embodiment, there are five low bits within the set of low bits of the associated variable of the object, such that the first high bit within the set of high bits of this variable is the sixth bit, such that 2 to the fifth bit equals the boundary value of 32.

If the associated variable is less than the boundary value, but nonzero, this signifies that none of the high bits have been set to one, such that the set of high bits followed by a number of zero bits equal to the number of low bits (that is, the associated variable with the low bits zeroed) does not point to a lock object. Thus, the object has a spin status, meaning that a lock object is in process of being assigned to the object, such that in 309 the thread waits until the lock object is pointed to by the set of high bits of the associated variable of the object, as the set of high bits is followed by a number of zero bits equal to the number of low bits. In this case, the thread shall yield control, for instance by calling Win32 function Sleep( ).

Upon the associated variable of the object with the low bits zeroed pointing to a lock object, as assigned by the recyclable locking mechanism, control proceeds from 306 to 307. In 309 it is determined whether the set of low bits is equal to zero. If they are, then this means that the object is currently being used by another thread (i.e., the object has an in-use status), and the thread that asserted the instruction must wait in 309 until this other thread has finished using the object, in the case where this other object has exclusive access to the object. Once the set of low bits is not equal to zero, then this means that no other threads are using the object, and control proceeds to 311, where the lock is allocated. Then in 312, the set of high bits of the associated variable (followed by a number of zero bits equal to the number of bits in the set of low bits) is used as a pointer to a lock object. It is noted that the conditions of 306 and 307 are arbitrarily ordered as shown in FIG. 3, and in another embodiment, the conditional testing of 307 can be performed prior to the conditional testing of 306, as those of ordinary skill within the art can appreciate (i.e., testing for a nonzero of the set of low bits is performed first, and then testing for a greater than boundary value condition of the associated variable is performed).

Once the thread has finished using the object, it decrements the associated variable of the object, in one embodiment by 1, in 314. In another embodiment, the thread accomplishes this decrementation by sending a second, unlock request to the recyclable locking mechanism, and the mechanism itself performs the decrementation. In another embodiment, the thread accomplishes the decrementation itself. In 316, it is determined whether the associated variable is equal to a predetermined threshold, in one embodiment, −1. If this is the case, then this means that no other threads are desiring to use this object (i.e., no other objects are waiting in 309 in their traversal through the flowchart of FIG. 3), and the lock object is recycled in 318 for reuse; the method then ends at 320. If this is not the case, then the method ends at 320 without recycling the lock object, since it is still being used to lock the object because the object is being used by other threads.

Data Structures

Figure 4A:
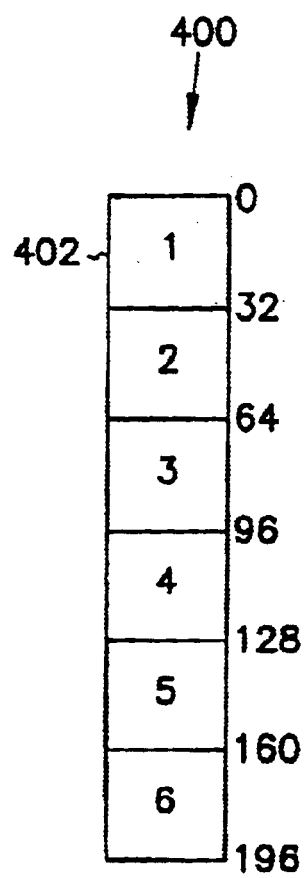
FIG. 4(a) shows a diagram of a pool of locks according to an embodiment of the invention; and, FIG. 4(b) shows a diagram of a variable of an object according to an embodiment of the invention.
Figure 4B:
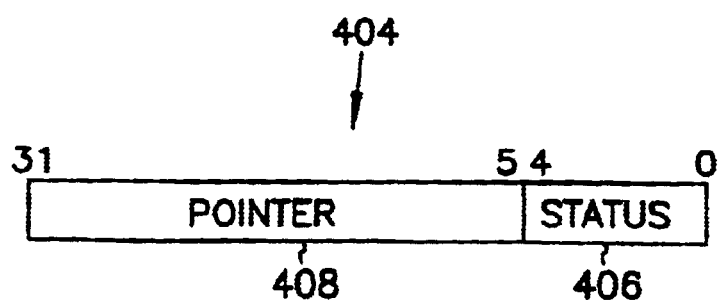

In this section of the detailed description, data structures according to an embodiment of the invention are shown, by reference to FIG. 4(a) and FIG. 4(b). Referring first to FIG. 4(a), a diagram of a pool of locks according to an embodiment of the invention is shown. The pool of locks 400 has six locks, such as the lock 402. Each lock address is separated from a subsequent lock address by 32, or 2 to the fifth power, as shown. Referring next to FIG. 4(b), a diagram of an associated variable of an object, according to this embodiment of the invention, is shown. The associated variable 404 has a set of low bits 406 which corresponds to a status variable of the object, and a set of high bits 408 which, when the low bits 406 are zeroed, corresponds to a lock pointer for the object. As shown, the set of low bits includes 5 bits, and the set of high bits includes 27 bits.

It is noted that the boundaries between the lock addresses within the pool of locks of FIG. 4(a) are at intervals equal to 2 to the number of low bits of the set of low bits of FIG. 4(b) power. Thus, when the set of high bits of FIG. 4(b) is nonzero, and the set of low bits is zeroed, then the resulting associated variable points to one of the locks within the pools of locks of FIG. 4(a). This relationship may be generalized: the locks within a pool of locks are in one embodiment at intervals equal to 2 to the number of low bits of the set of low bits of an associated variable of an object power. Furthermore, in this embodiment there is a sufficient number of high bits to be able to address all the locks within the pool when the set of low bits is (temporarily) zeroed.

Conclusion

Recyclable locking for multi-threaded environments has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A system comprising:
   at least one thread;
   a pool of locks;
   at least one object that is capable of representing a resource needed by the at least one thread, the at least one object having a variable, the variable of the at least one object comprising a set of high bits defining the pointer to a lock and a set of low bits defining a status variable; and,
   a recyclable locking mechanism for associating a lock from the pool of locks with the at least one object using the variable as a pointer when requested by the at least one thread, the lock returning to the pool of locks without having to destroy the at least one object when the at least one thread no longer needs to access the resource.

2. The system of claim 1, wherein the set of high bits comprises 27 bits and the set of low bits comprises 5 bits.

3. The system of claim 1, wherein the set of low bits is initially set to −1.

4. The system of claim 1, wherein upon the first request the set of low bits is incremented by 1.

5. The system of claim 4, wherein upon the set of low bits after incrementation by one being greater than 0, the variable has an in-use status by a thread such that the set of high bits points to a lock.

6. The system of claim 4, wherein upon the variable after incrementation by one being less than 32, the variable has a spin status such that the set of high bits is currently in the process of being set to a lock.

7. The system of claim 1, wherein the recyclable locking mechanism further is to deassociate the lock from the object upon a second request by the thread, such that upon the second request the set of low bits is decremented by 1.

8. A method comprising:

asserting an instruction by a thread to lock an object;

increasing a variable of the object, the variable having a set of high bits for representing a pointer to a lock and a set of low bits for representing a lock status;

determining whether the variable is greater than a boundary value so as to allocate the lock; and recycling the lock by returning the lock to a pool of locks when the thread no longer needs the object regardless of whether the object persists after the lock returns to the pool of locks.

9. The method of claim 8, further comprising initially setting the variable of the object to −1.

10. The method of claim 8, further comprising upon determining that the variable is less than the boundary value, waiting until the variable is greater than the boundary value.

11. The method of claim 8, further comprising upon determining that the variable is greater than the boundary value, using the set of high bits of the variable as a pointer to a lock for the object.

12. The method of claim 11, further comprising:

decrementing the variable of the object; and, determining whether the variable is less than a minimum threshold.

13. The method of claim 12, upon determining that the variable is less than the minimum threshold, recycling the lock.

14. A computer comprising:

a processor;

a computer-readable medium; and, a recyclable locking mechanism program executed by the processor from the computer-readable medium to associate a lock with an object using a variable of the object as a pointer when requested by a thread, the variable of the object comprising a set of high bits defining the pointer to a lock and a set of low bits defining a status variable, the lock returning to a pool of locks without having to destroy the object when the object is no longer needed by the thread.

15. A computer-readable medium having a recyclable locking mechanism program stored thereon for execution on a computer to associate a lock with an object using a variable of the object as a pointer when requested by a thread the variable of the object comprising a set of high bits defining the pointer to a lock and a set of low bits defining a status variable, the lock returning to a pool of locks without having to destroy the object when the object is no longer needed by the thread.

* * * * *